US012325582B2

(12) United States Patent
Yang

(10) Patent No.: US 12,325,582 B2
(45) Date of Patent: Jun. 10, 2025

(54) METHOD FOR MANAGING GARBAGE DISPOSAL CREDIT REPORTING

(71) Applicant: BEIJING CORE SYSTEM TECHNOLOGY CO., LTD., Beijing (CN)

(72) Inventor: Manliang Yang, Beijing (CN)

(73) Assignee: BEIJING CORE SYSTEM TECHNOLOGY CO., LTD., Beijing (CN)

(*) Notice: Subject to any disclaimer, the term of this patent is extended or adjusted under 35 U.S.C. 154(b) by 507 days.

(21) Appl. No.: 17/649,063

(22) Filed: Jan. 26, 2022

(65) Prior Publication Data

US 2022/0144541 A1 May 12, 2022

Related U.S. Application Data

(63) Continuation of application No. PCT/CN2020/089772, filed on May 12, 2020.

(30) Foreign Application Priority Data

Jul. 26, 2019 (CN) .......................... 201910680583.X

(51) Int. Cl.
*B65F 1/14* (2006.01)
*G06Q 10/30* (2023.01)
(52) U.S. Cl.
CPC ........... *B65F 1/1484* (2013.01); *G06Q 10/30* (2013.01); *B65F 2210/1123* (2013.01);
(Continued)

(58) Field of Classification Search
CPC . B65F 1/1484; B65F 2210/1123; G06Q 10/30
See application file for complete search history.

(56) References Cited

U.S. PATENT DOCUMENTS

2008/0190953 A1* 8/2008 Mallett .................. B07C 7/005
221/13
2011/0238598 A1* 9/2011 Borowski ............. B65F 1/0066
705/500
(Continued)

FOREIGN PATENT DOCUMENTS

CN 103466242 A 12/2013
CN 104495139 A 4/2015
(Continued)

OTHER PUBLICATIONS

Wahab et al "Smart Recycle Bin" 2014 International conference on IT convergence and security (ICITCS), 2014 (Year: 2014).*

(Continued)

*Primary Examiner* — Andrew Chase Lakhani
(74) *Attorney, Agent, or Firm* — Porus IP LLC

(57) ABSTRACT

Provided is a method for managing garbage disposal credit reporting. The method comprises: a smart garbage can performing online real-time marking of bagged garbage, photographing scattered garbage after it is disposed of, and a system obtaining information transmitted by the smart garbage can, after each time garbage is disposed of, the smart garbage can saving for a certain period of time the traceable information generated by the disposed garbage; when inspecting the disposed garbage, if a delivery error is discovered, the inspecting client uploading the erroneous marking information on the garbage bag and uploading the erroneous scattered garbage photograph, in order to evaluate the credit of the person who throws garbage into the garbage can according to whether the information about the type of garbage disposed is correct.

14 Claims, 5 Drawing Sheets

(52) U.S. Cl.
CPC ... *B65F 2210/128* (2013.01); *B65F 2210/138* (2013.01); *B65F 2210/15* (2013.01)

(56) References Cited

U.S. PATENT DOCUMENTS

| | | | |
|---|---|---|---|
| 2014/0050397 A1* | 2/2014 | Badholm | B07C 5/3412 |
| | | | 382/165 |
| 2014/0379588 A1* | 12/2014 | Gates | G06Q 10/0631 |
| | | | 705/308 |
| 2018/0243800 A1* | 8/2018 | Kumar | G06N 20/00 |
| 2019/0130560 A1* | 5/2019 | Horowitz | G06F 18/41 |
| 2020/0189844 A1* | 6/2020 | Sridhar | G06Q 30/0226 |
| 2021/0178432 A1* | 6/2021 | Zeng | B07C 5/3422 |
| 2021/0188541 A1* | 6/2021 | Kurani | B65F 1/14 |

FOREIGN PATENT DOCUMENTS

| | | | | |
|---|---|---|---|---|
| CN | 105184691 | A | 12/2015 | |
| CN | 105730930 | A | 7/2016 | |
| CN | 206639234 | U | 11/2017 | |
| CN | 107539671 | A | 1/2018 | |
| CN | 206865828 | U | 1/2018 | |
| CN | 108408286 | A | 8/2018 | |
| CN | 108706241 | A | 10/2018 | |
| CN | 109230040 | A | 1/2019 | |
| CN | 109299790 | A | 2/2019 | |
| CN | 109410425 | A | 3/2019 | |
| CN | 109823731 | A | 5/2019 | |
| CN | 209064797 | U | 7/2019 | |
| CN | 110390373 | A | 10/2019 | |
| CN | 110733771 | B * | 3/2023 | ............ B65F 1/0053 |
| WO | 2014179667 | A2 | 11/2014 | |

OTHER PUBLICATIONS

Raman et al, "Real-Time Video Management System for Robotic Waste Sorting and Recycling Using IOT and Machine Learning" 2023 Second International Conference on Smart Technologies for Smart Nation (SmartTechCon 2023), 2023, access Apr. 7, 2025 (Year: 2023).*

International Search Report in PCT/CN2020/089772 mailed on Aug. 3, 2020, 7 pages.

Written Opinion in PCT/CN2020/089772 mailed on Aug. 3, 2020, 6 pages.

* cited by examiner

METHOD FOR MANAGING GARBAGE DISPOSAL CREDIT REPORTING

CROSS-REFERENCE TO RELATED APPLICATIONS

This application is a continuation of International application No. PCT/CN2020/089772, filed May 12, 2020, which claims priority of Chinese Patent Application No. 201910680583.X filed on Jul. 26, 2019, the contents of which are incorporated herein by reference.

TECHNICAL FIELD

The present disclosure relates to the technical field of garbage disposal, in particular to a garbage delivery credit investigation management method, device and system.

BACKGROUND

Garbage disposal is a difficult problem that has been perplexing human living environment. The current waste classification and treatment methods rely on manual monitoring or spontaneous classification and release of unconstrained treatment. This wastes a lot of human resources, or has no obvious substantive effect.

At present, a large number of intelligent waste classification equipment are expensive and basically non-binding, and still need people to deal with them consciously and spontaneously. The so-called intelligence is just turning ordinary garbage cans into expensive garbage cans that burn money, and there is no real classification effect.

SUMMARY

The technical problem to be solved by the disclosure is to provide a garbage delivery credit investigation management method, device and system, which can automatically standardize the behavior of processing garbage classified delivery in an effective credit investigation way. First of all, the disposer in the following refers to the person who throws the garbage into the garbage can.

In order to solve the above technical problems, the disclosure provides a garbage delivery credit investigation management method. The method includes: obtaining the marking information transmitted by the intelligent garbage can and marked by the intelligent garbage can after each garbage delivery, wherein the marking information includes the type information of the garbage, the coding information of the bagged garbage, photo information of scattered garbage, inherent number of garbage can, delivery time and mobile phone number of the person who throws garbage into the garbage; Save the marking information corresponding to each garbage release; When inspecting the delivered garbage, if a delivery error is found, the verifier client uploads the wrong garbage delivery traceable information to evaluate the credit of the person who throws garbage into the garbage can.

In some embodiments, the garbage divided into bagged garbage and scattered garbage.

In some embodiments, for scattered garbage, the marking information includes: taking photos of the scattered garbage.

In some embodiments, for scattered garbage, the garbage delivery credit investigation management method includes: uploading photos of the scattered garbage by the client of the person who throws garbage into the garbage can, or uploading photos of the scattered garbage by the intelligent garbage can; Judge whether the scattered garbage is correctly put in through the archive comparison of the uploaded photos or the AI identification of the taken photos.

In some embodiments, for bagged garbage, the garbage delivery credit investigation management method includes: online real-time coding and marking of bagged garbage without consumables without regular maintenance through intelligent garbage can, or scanning the printed QR Code or Bar Code on the garbage bag. Online real-time coding and marking of bagged garbage is a new creation, because this method is extremely difficult to realize, this application is proposed and used for the first time. The garbage bags filled with garbage is completely irregular, moreover, the garbage can is in a harsh environment, with a wide range of outdoor temperature and humidity, and many corrosive gases and liquids. So, at present, the existing applications of acoustic, optical, electrical and magnetic technologies in the field of mark recognition cannot be realized by existing technologies. Even the known method that uses consumables and needs to supplement consumables regularly is not practical. Our fully independent intellectual property online marker without consumables, without regular maintenance and manual intervention has overcome this problem, and the cost is low, which is really in line with the purpose of practicability and reliability in invention and creation.

In some embodiments, all garbage is not identified locally, and each photo and tag information are not identified on the server side. Only a certain tag information and photo are compared when needed.

In some embodiments, artificial intelligence (AI) processing performs comprehensive and accurate comparative analysis on the material properties of the target waste, not limited to color, size and shape, including whether the material type meets the classification requirements.

In some implementation modes, the big data processing technology realizes mass storage, can comprehensively analyze and evaluate the behavior of the dispenser, can realize the statistics of regional garbage distribution and the overall planning of the placement position and quantity of garbage cans.

In some embodiments, the intelligent trash can has its own Global Position System (GPS) positioning, or uses the positioning function of the dispenser's client to locate.

In some embodiments, the marking information includes the type information of the garbage to be put, the coding information of the bagged garbage, the photo information of the scattered garbage, the inherent number of the garbage can, the putting time, the mobile phone number of the person who throws garbage into the garbage can, etc.

In some embodiments, the marking method of the intelligent garbage can for the placed garbage includes automatic marking and manual marking.

In some embodiments, if the garbage bag of bagged garbage itself has a QR Code or Bar Code, there is no need to code and mark the bagged garbage online in real time, but the client can scan the QR Code or Bar Code.

In some embodiments, the automatic marking process includes: the releaser client selects whether the dropped garbage is bagged garbage or scattered garbage; if it is bagged garbage, you will be prompted to select the type of garbage. After selection, the corresponding garbage can door will be opened automatically. The user will put in the garbage and wait for the garbage can door to be closed automatically. The garbage can will code and mark the bagged garbage inside.

In some embodiments, the manual marking process includes: the releaser client selects whether the dropped garbage is bagged garbage or scattered garbage; If it is bagged garbage, select whether it is a garbage bag with QR Code or Bar Code; If it is a garbage bag without QR Code or Bar Code, you will be prompted to put the garbage bag close to the online marker installed on the bucket table for code marking. After marking, you will be prompted to select the garbage type. After selection, the corresponding garbage can door will be opened automatically. The user will put garbage and wait for the garbage can door to be closed automatically.

In addition, the disclosure also provides a garbage delivery credit investigation management device, which comprises: one or more processors; A storage device for storing one or more programs, when the one or more programs are executed by the one or more processors, so that the one or more processors realize the garbage delivery credit investigation management method described above.

In addition, the disclosure also provides a garbage delivery credit investigation management system. The system includes a client of the person who throws garbage into the garbage can, a verifier client, an intelligent garbage can and a central server. The client of the person who throws garbage into the garbage can is connected to the intelligent garbage can, the intelligent garbage can is connected to the central server, and the verifier client is connected to the central server.

With such a design, the present disclosure has at least the following advantages:

Through the intelligent processing technology, the garbage can be tracked and remembered, and the reputation evaluation and even punishment can be carried out for the individuals who do not put the garbage according to the classification requirements, so as to automatically standardize the behavior of garbage classification and placement in an effective way of credit investigation.

BRIEF DESCRIPTION OF THE DRAWINGS

The above is only an overview of the technical scheme of the present disclosure. In order to better understand the technical means of the present disclosure, the present disclosure is further described in detail below in combination with the accompanying drawings and specific embodiments.

DETAILED DESCRIPTION

Figure 1:
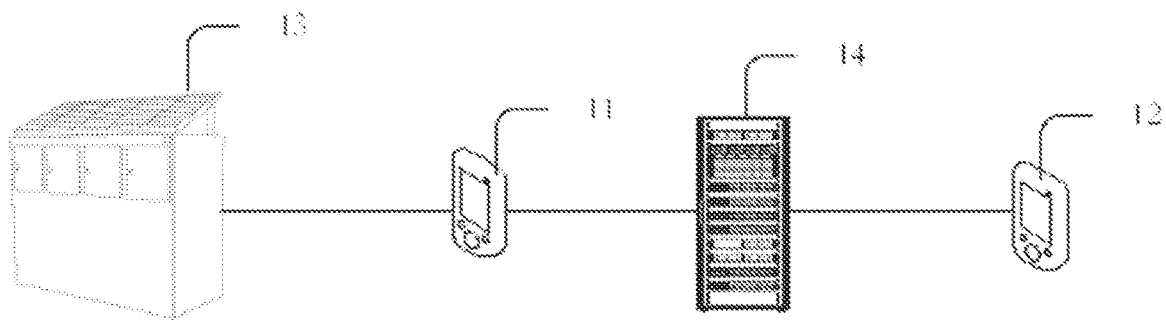
FIG. 1 is a structural diagram of a garbage delivery credit investigation management system provided by the present disclosure.

The preferred embodiments of the present disclosure are described below in combination with the accompanying drawings. It should be understood that the preferred embodiments described herein are only used to illustrate and explain the present disclosure and are not used to limit the present disclosure.

In today's society, video surveillance is almost everywhere. The behavior of littering is not within the scope of the present disclosure and is constrained by video surveillance.

The entity of the disclosure is an intelligent garbage can. If an individual wants to put garbage, he needs to scan the code on garbage can, open the garbage can door, and then throw the garbage in any ordinary garbage bag into garbage can, after the garbage bag is put into the garbage can, it will be automatically marked with the online marker with our completely independent intellectual property rights, or the user needs to scan the Bar Code or QR Code on the garbage bag to obtain the marking information (this can be selected only when the random Bar Code or QR Code has been marked in the garbage bag production process), and the ID generated by the marking is written into the remote database for reference. This ID includes the telephone number information of the person who throws garbage into the garbage can, the inherent number of the garbage can itself and the delivery time. For the delivery of scattered garbage that is not packed in garbage bags, users are automatically required to take photos and upload the garbage after it is delivered.

When the garbage is checked by the garbage checker, if it is found that it is not correctly classified, if it is bagged garbage, you can use the mark on the garbage bag to query; If it is scattered garbage and there are few wrong garbage and a single type, take photos to upload and AI(Artificial Intelligence) comparison between photos uploaded and the recorded pictures on the server, or download the release record photos of this storage tank in garbage can for manual comparison to find out the person who throws wrong garbage into the garbage can; if it is scattered garbage and there are many wrong garbage or there are multiple wrong garbage of the same kind, ask the server to AI screen all the archived photos of scattered garbage of this storage tank in garbage can, or download all the release record photos of this storage tank that in the garbage can for manual screening select and find out all the wrong users. After finding the wrong person who throws garbage into the garbage can, credit evaluation or immediate punishment will be given to the person who throws garbage into the garbage can. Individuals with low credit rating scores need to pay a fine before they can continue to put in garbage next time.

For the elderly and children who do not have the ability to operate with smart phones, they can only turn to adults of appropriate age, community managers, health personnel, etc., or go to the nearest supervised delivery point for delivery. The disclosure slightly increases the inconvenience or randomness of people throwing garbage, but in order to have a good living space and reduce the spread of bacteria as much as possible, it is also appropriate to spend a little time, and any classification behavior will inevitably increase the inconvenience.

Garbage cans mainly have multiple groups of independent storage tanks (recyclables, hazardous waste, wet waste, dry waste, etc.), electric control door, on-line marker, residual space detection, etc. The communication between the garbage can and the outside world, on-line fast and permanent marking of garbage bags, and garbage can power supply are the three core contents. In addition, there are auxiliary small functions such as garbage can door switch control, turnover control, residual space detection in the garbage can, etc.

There are two versions of communication between bucket and the outside world. The first is to connect with mobile phone through Bluetooth, all data that needs to be transmitted to the remote server, will transmits to the mobile phone via the mobile phone app (application) through Bluetooth, and then the mobile phone transmit data to the remote server through the telecommunication network. This version requires the user to turn on the Bluetooth function on the mobile phone, which will take a little more steps. The second is to use NB-IoT (Narrow band Internet of things) module or IOT card module directly communicates with the remote server, and users do not need to turn on the Bluetooth of the mobile phone.

There are two versions of the way to mark bagged garbage. One is the automation scheme with higher cost compared with the second scheme, which uses the low-cost and efficient automatic online marker independently invented by our company installed in each storage tank to quickly and permanently mark garbage bags online, and each marking generates an independent ID code; the other is a low-cost manual marking scheme. The manual scheme is that only one online marker is installed on the whole garbage can, and the marker is installed on the surface of the garbage can, if the garbage bag have QR code or Bar Code, the user scans the QR Code or Bar Code on the garbage bag, if the garbage bag have no QR Code or Bar Code, selects to use the marker on the garbage bag, when marking, the user needs to put the garbage bag close to the marker for marking, and throw it into the garbage can after code scanning or marking.

The garbage can power supply scheme supports two schemes: photovoltaics power supply or municipal power supply. The opening and closing of the garbage can door is controlled by electromagnetic lock, and the remaining space in the garbage can is detected by infrared detection means.

All components in this method have no fixed term and limited consumables, and there are no components that need to be replaced regularly. If there is a problem, system can report it to the management center or the user through its own detection, and then carry out the necessary random single maintenance.

Figure 2:
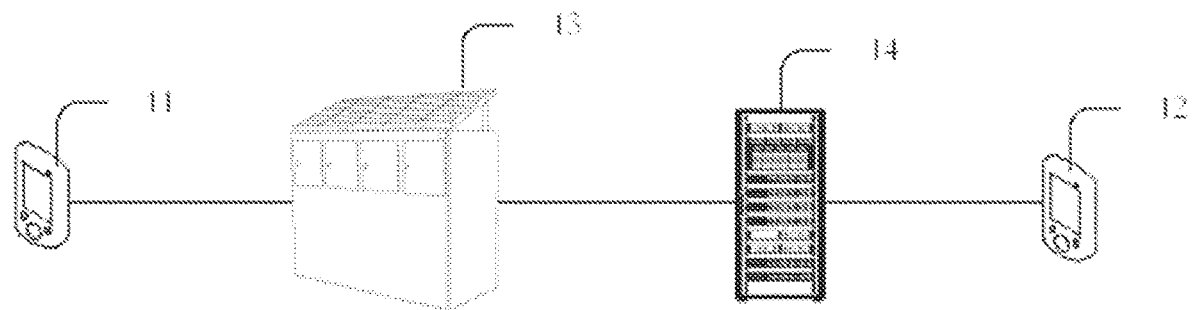
FIG. 2 is a structural diagram of a garbage delivery credit investigation management system provided by the present disclosure.

FIG. 1 and FIG. 2 show the system structure of the Bluetooth version and the direct connection version, respectively. The system structure shown in FIG. 1 corresponds to the Bluetooth version, and the system structure shown in FIG. 2 corresponds to the direct connection version. Referring to FIG. 1 and FIG. 2, the system includes: the client of the person who throws garbage into the garbage can 11, verifier client 12, intelligent garbage can 13 and big data server 14. On the big data server 14, the management center software is running.

Figure 3:
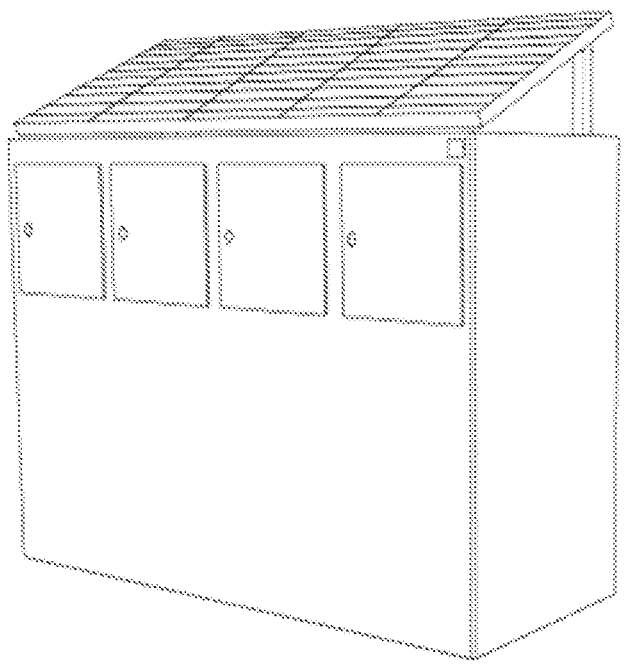
FIG. 3 is a perspective view of an intelligent garbage can provided by the present disclosure.
Figure 4:
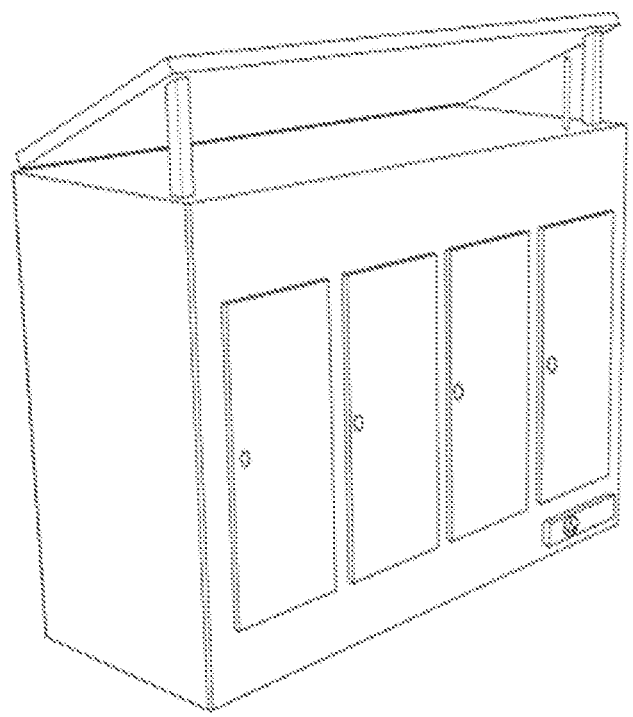
FIG. 4 is a perspective view of an intelligent garbage can provided by the present disclosure.

The appearance design of the garbage can is simple and durable, and does not waste resources. The specific appearance is shown in FIG. 3 and FIG. 4.

The mobile phone APP can be implemented by WeChat applet or Alipay applet, or by independent APP. According to the type of login personnel, there are two different interfaces, one is the garbage disposer and the other is the garbage checker.

The garbage disposer app is responsible for scanning the code on garbage can and opening the garbage can. After the user scans the code on garbage can, if it is the Bluetooth version and Bluetooth is not turned on, it will prompt to turn on Bluetooth. Manual login is required for the first login. If not first login, that is to say, you have logged in at some time, it will automatically log in. After successful login, if there is a penalty to be paid, proceed to the next step after paying the balance, if there is no penalty, you can directly enter the type of delivery, if it is an automatically online marked version, the corresponding garbage can door will be opened automatically, the user puts the garbage bag into the middle of the flip plate in the garbage can (too much deviation will be prompted), if it is manually marked, the user will scan the QR Code or Bar Code on the garbage bag, if there is no QR Code or Bar Code on the garbage bag, the user needs to mark the garbage bag close to the marker installed on the surface of the garbage can, after completion, the garbage can door will open automatically and throw garbage into the garbage can; if it is scattered garbage that is not packed in a bag, users need to take photos and upload after actively putting the garbage on the flip plate in the garbage can, so that the user can retain the evidence of appeal, if they do not take the initiative to take photos and upload them, once they are detected by the devices in the garbage can or the garbage sorting and transportation personnel, they will be included in the dishonesty record. After the operation is completed, wait for the garbage can door to close automatically, and then completed everything. The app on the mobile terminal of the garbage disposer also has other functions, such as delivery records.

The garbage checker app can provide the function of reporting violations. For packaged illegal garbage, you can enter the detected tag code for reporting. For illegal scattered garbage, you can take photos and upload. The garbage checker app also has the function of calling garbage practitioners, that is, people who pick up garbage to obtain income for partial transportation, Call the city manager for public transportation and other functions. If the garbage checker and garbage practitioner register with their mobile phone number, they need to upload their identity card. If there is an ID assigned by a special agency, they can log in with this ID instead of uploading their identity card.

The mobile app is simple and easy to use.

Figure 5:
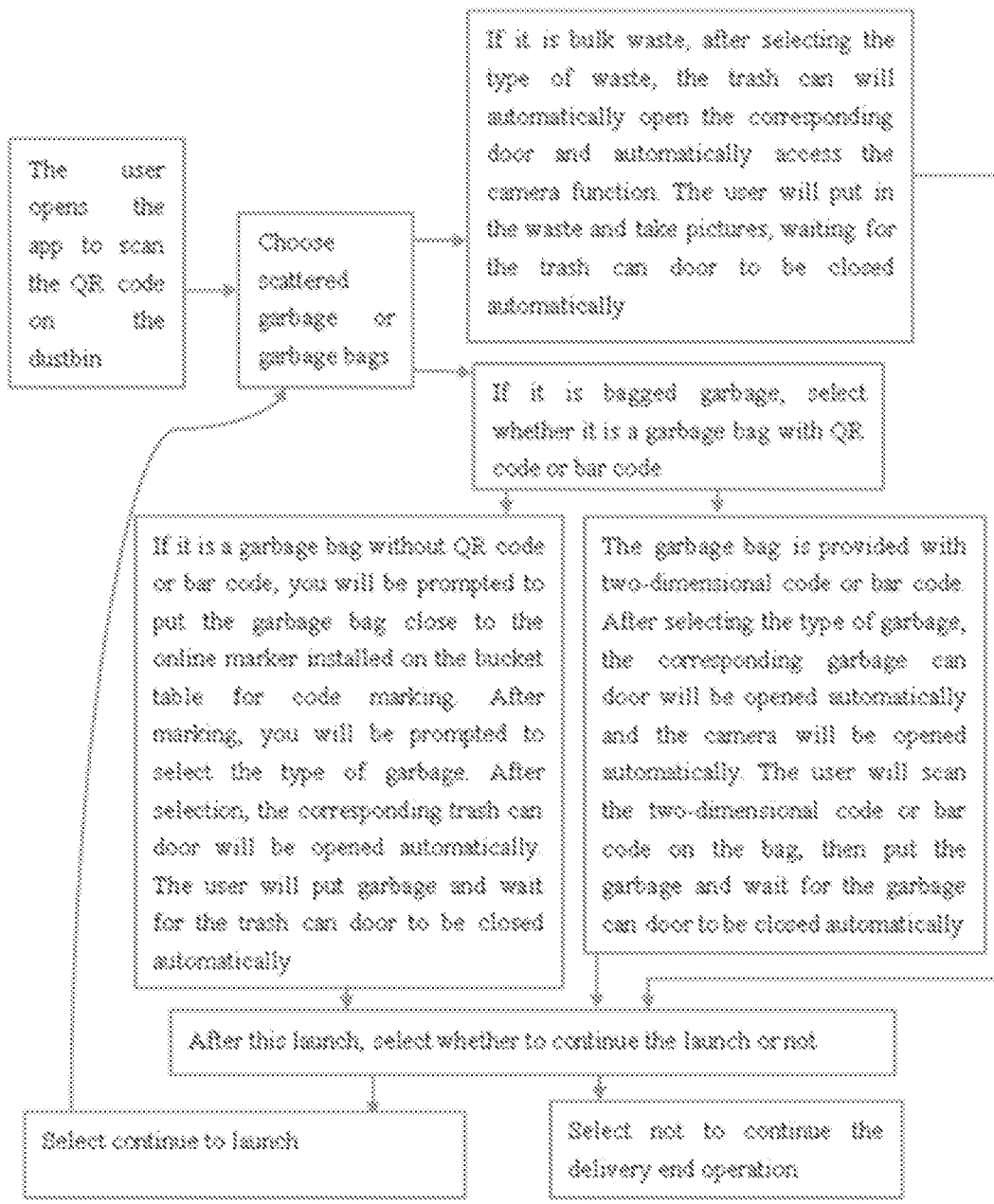
FIG. 5 is an operation flowchart of the manual marking process provided by the present disclosure.
Figure 6:
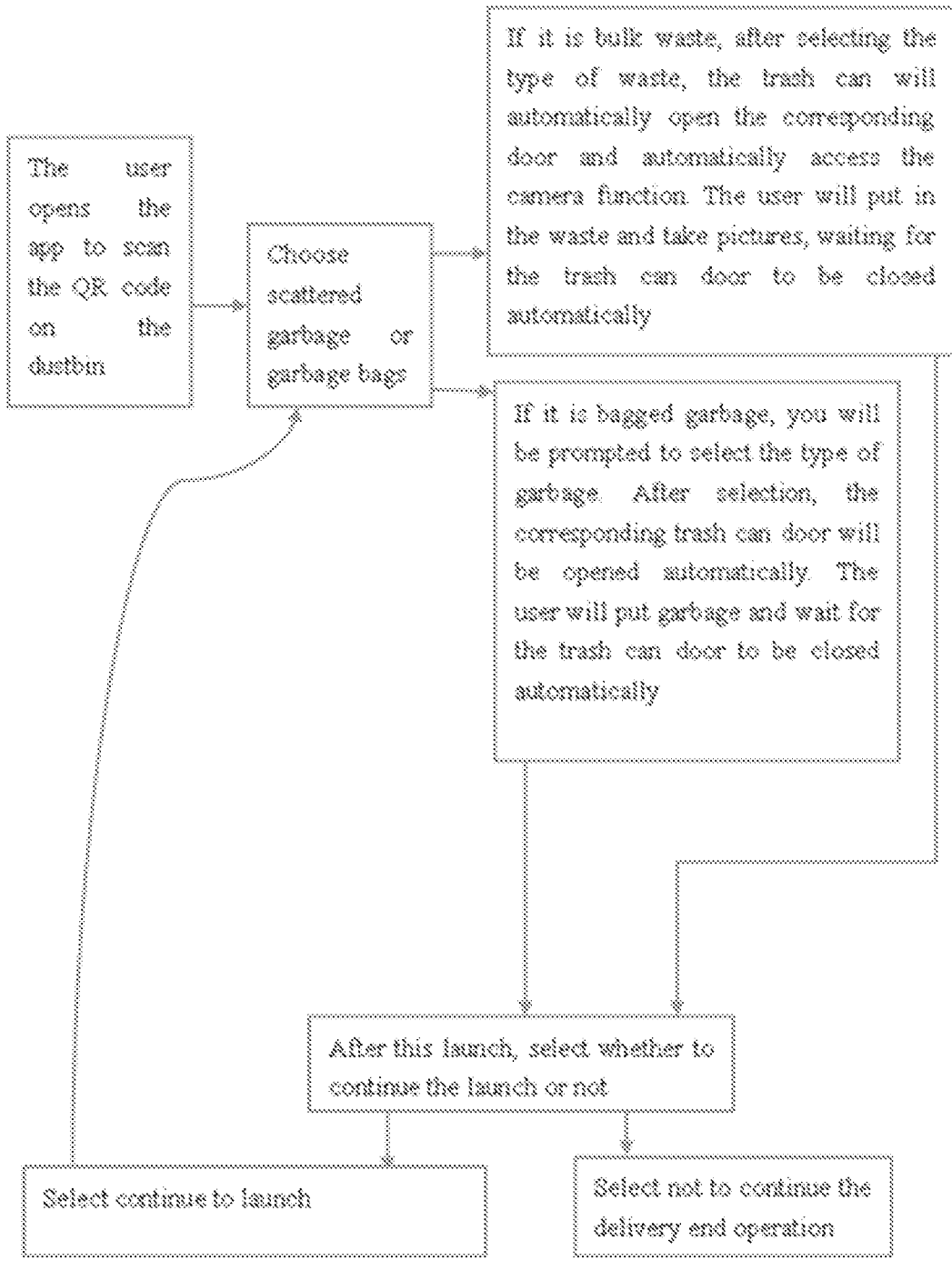
FIG. 6 is an operation flowchart of the automatic marking process provided by the present disclosure.

FIG. 5 and FIG. 6 show the operation flow of the manual marking and automatic marking version of the publisher's mobile terminal 11, respectively. The main difference between the process shown in FIG. 5 and that shown in FIG. 6 is that the process shown in FIG. 5 is a manual marking process, and the user will be prompted to mark the type of garbage and other information during the operation. The process shown in FIG. 6 is an automatic marking process. The marking action of garbage placement is automatically completed by the online marker without prompting the user.

Figure 7:
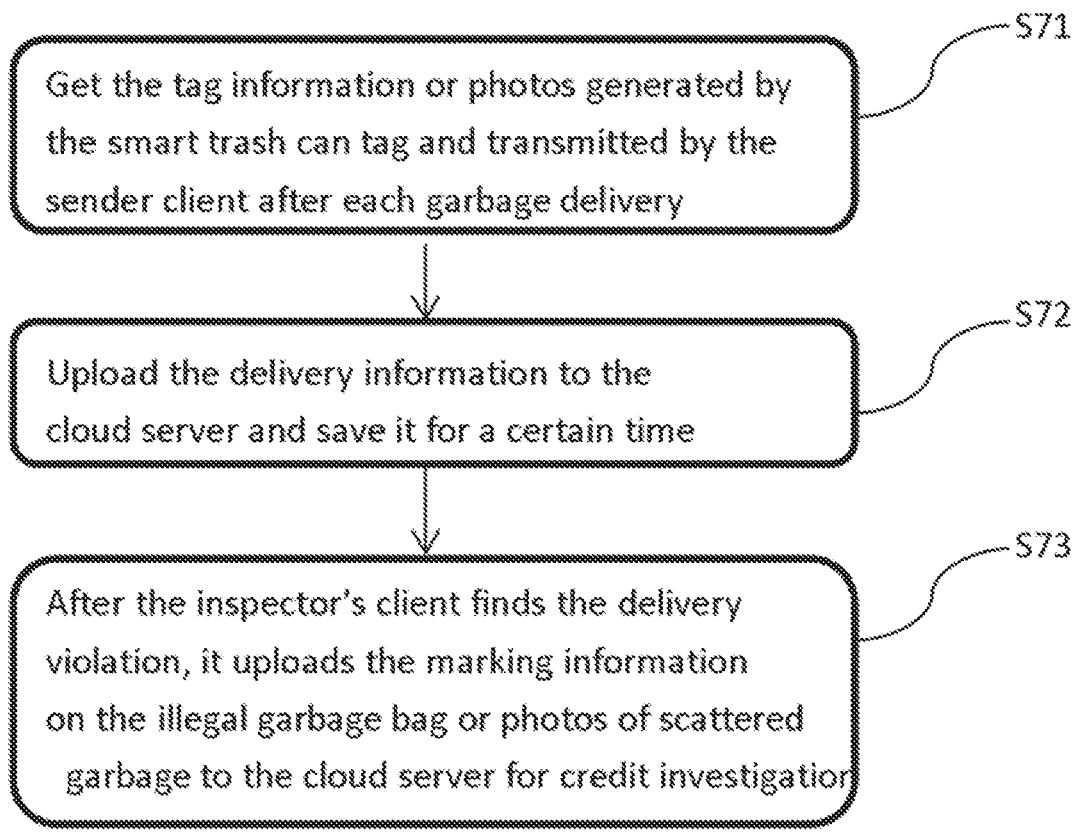
FIG. 7 is a flowchart of a garbage delivery credit investigation management method provided by the present disclosure.

FIG. 7 shows a flowchart of a garbage delivery credit investigation management method provided by the present disclosure. Referring to FIG. 7, the management method of garbage delivery credit investigation includes:

S71, obtain the tag information or photos generated by the smart garbage can and transmitted by the disposer client after each garbage delivery.

S72, upload the delivery information to the cloud server and save it for a certain time.

S73, after the checker finds the delivery violation, it uploads the marking information on the illegal garbage bag or takes photos of scattered garbage to the cloud server for credit investigation.

The method shown in FIG. 7 is executed by the big data server in the garbage delivery credit investigation management system mentioned above in order to complete the credit investigation evaluation of the garbage disposer.

The present disclosure can truly realize garbage classification. The reliable garbage classification and credit investigation system technology of the present disclosure is mainly realized by online marking of the garbage that has been packaged into the garbage bag, scanning the QR Code or Bar Code on the garbage bag and binding independent photographing and uploading of scattered garbage. This is a completely independent invention, and has not found a technology that can truly realize garbage classification except the present disclosure.

The above is only a preferred embodiment of the present disclosure and does not limit the present disclosure in any form. It falls within the scope of protection of the present disclosure for those skilled in the art to make some simple modifications, equivalent changes or modifications by using the above disclosed technical contents.

What is claimed is:

1. A method for managing garbage disposal credit reporting, implemented in a garbage delivery credit investigation management system including:
   a garbage disposer client, an inspector client, an intelligent garbage can, and a big data server;
   wherein the intelligent garbage can includes a plurality of independent storage tanks for storing different types of garbage, each storage tank has two garbage can doors, online markers and cameras are installed on the storage tanks, and electromagnetic locks are installed on the garbage can doors;
   the method comprising:
   after each garbage delivery of a bagged garbage, marking, by the online markers of the intelligent garbage can, the bagged garbage;
   sending, by the intelligent garbage can, marking information corresponding to the marked bagged garbage to the big data server;
   after each garbage delivery of a scattered garbage, taking, by the garbage disposer client or the cameras of the intelligent garbage can, one or more photos of the delivered scattered garbage;
   uploading, by the garbage disposer client or the intelligent garbage can, the one or more photos to the big data server for saving the one or more photos; wherein the intelligent garbage can is equipped with a Global Position System (GPS) positioning device, disposer's identification information including at least one of a telephone number, a type of garbage, an inherent number of the intelligent garbage can, a delivery time, and positioning coordinates of a launch site are uploaded to the big data server together with the marking information or the one or more photos;
   when a garbage is checked by a garbage checker, if it is found that the garbage is not correctly classified, if the garbage is a bagged garbage, the garbage checker uses a mark on a garbage bag of the garbage to query a user who throw the garbage;
   if the garbage is a scattered garbage and there are few wrong garbage with a single type, taking, by the inspector client, one or more photos of the garbage to upload to the big data server;
   performing, by the big data server, Artificial Intelligence (AI) comparison between the one or more uploaded photos of the garbage and recorded pictures of the garbage saved on the big data server to find out the user who throws the garbage into the intelligent garbage can;
   if the garbage is a scattered garbage, and there are many wrong garbage or there are multiple wrong garbage of the same kind, performing, by the big data server, AI screening on all archived photos of scattered garbage of the storage tank in the intelligent garbage can to find out all users who throw garbage into a wrong storage tank;
   evaluating, by the big data server, credit of the users who throw garbage into a wrong storage tank to give a punishment to the users;
   wherein a marking way of the intelligent garbage can for the delivered garbage includes an automatic marking way or a manual marking way;
   the automatic marking way includes:
   scanning, by a user client, a matrix code or a bar code printed on the intelligent garbage can;
   determining, by the user client, whether the garbage is bagged or scattered;
   in response to determining that the garbage is a bagged garbage, determining whether the bagged garbage is with a garbage bag having a matrix code or a bar code;
   in response to determining that there is no matrix code or bar code on the garbage bag, prompting to select a type of the garbage;
   after the selection, automatically opening the corresponding garbage can door, so as to allow a user to put the garbage and wait for the corresponding garbage can door to be closed automatically; and
   automatically performing, by the online markers, online real-time coding and marking on the garbage bag inside the intelligent garbage can.

2. The method of claim 1, wherein
   the intelligent garbage can includes a flip plate;
   a middle of the flip plate is used to place the garbage; and
   the intelligent garbage can processes the garbage on the flip plate, including taking photos and marking the bagged garbage.

3. The method of claim 1, wherein each storage tank is equipped with an infrared detector to detect remaining space in the intelligent garbage can.

4. The method of claim 1, wherein a power supply scheme of the intelligent garbage can supports two schemes including photovoltaics power supply or municipal power supply.

5. The method of claim 1, wherein a version of communication between the intelligent garbage can and an outside world is to connect with a mobile phone through Bluetooth, all data that needs to be transmitted to a remote server will transmits to the mobile phone via a mobile phone application through the Bluetooth, and then the mobile phone transmits data to the remote server through a telecommunication network, and the first version requires a user to turn on a Bluetooth function on the mobile phone.

6. The method of claim 1, wherein a version of communication between the intelligent garbage can and an outside world is to use Narrow band Internet of things (NB-IoT) module or internet of things (IoT) card module directly communicating with the remote server, and users do not need to turn on a Bluetooth function of the mobile phone.

7. The method of claim 1, wherein the on-line marker is a real-time coding marker and configured to mark the garbage bag with an encoded identification (ID) code, and the encoded ID code includes at least one of telephone number information of a person who throws the garbage into the garbage can, an inherent number of the garbage can, and a delivery time.

8. The method of claim 1, wherein the cameras of the intelligent garbage can are configured to take one or more photos of the delivered bagged garbage and send the one or more photos of the delivered bagged garbage to the big data server.

9. A garbage delivery credit investigation management system, comprising:
   a garbage disposer client, an inspector client, an intelligent garbage can, and a big data server, wherein the garbage delivery credit investigation management system is configured to realize a garbage delivery credit investigation management method;

wherein the intelligent garbage can comprises a plurality of independent storage tanks for storing different types of garbage, each storage tank has two garbage can doors, online markers and cameras are installed on the storage tanks, and electromagnetic locks are installed on the garbage can doors;

the garbage delivery credit investigation management method including:

after each garbage delivery of a bagged garbage, marking, by the online markers of the intelligent garbage can, the bagged garbage;

sending, by the intelligent garbage can, marking information corresponding to the marked bagged garbage to the big data server;

after each garbage delivery of a scattered garbage, taking, by the garbage disposer client or the cameras of the intelligent garbage can, one or more photos of the delivered scattered garbage;

uploading, by the garbage disposer client or the intelligent garbage can, the one or more photos to the big data server for saving the one or more photos; wherein the intelligent garbage can is equipped with a Global Position System (GPS) positioning device, disposer's identification information including at least one of a telephone number, a type of garbage, an inherent number of the intelligent garbage can, a delivery time, and positioning coordinates of a launch site are uploaded to the big data server together with the marking information or the one or more photos;

when a garbage is checked by a garbage checker, if it is found that the garbage is not correctly classified, if the garbage is a bagged garbage, the garbage checker uses a mark on a garbage bag of the garbage to query a user who throw the garbage;

if the garbage is a scattered garbage and there are few wrong garbage with a single type, taking, by the inspector client, one or more photos of the garbage to upload to the big data server;

performing, by the big data server, Artificial Intelligence (AI) comparison between the one or more uploaded photos of the garbage and recorded pictures of the garbage saved on the big data server to find out the user who throws the garbage into the intelligent garbage can;

if the garbage is a scattered garbage, and there are many wrong garbage or there are multiple wrong garbage of the same kind, performing, by the big data server, AI screening on all archived photos of scattered garbage of the storage tank in the intelligent garbage can to find out all users who throw garbage into a wrong storage tank;

evaluating, by the big data server, credit of the users who throw garbage into a wrong storage tank to give a punishment to the users;

wherein a marking way of the intelligent garbage can for the delivered garbage includes an automatic marking way or a manual marking way;

the automatic marking way includes:

scanning, by a user client, a matrix code or a bar code printed on the intelligent garbage can;

determining, by the user client, whether the garbage is bagged or scattered;

in response to determining that the garbage is a bagged garbage, determining whether the bagged garbage is with a garbage bag having a matrix code or a bar code;

in response to determining that there is no matrix code or bar code on the garbage bag, prompting to select a type of the garbage;

after the selection, automatically opening the corresponding garbage can door, so as to allow a user to put the garbage and wait for the corresponding garbage can door to be closed automatically; and automatically performing, by the online markers, online real-time coding and marking on the garbage bag inside the intelligent garbage can.

10. The system of claim 9, wherein the intelligent garbage can includes a flip plate;
a middle of the flip plate is used to place the garbage; and
the intelligent garbage can processes the garbage on the flip plate, including taking photos and marking the bagged garbage.

11. The system of claim 9, wherein a version of communication between the intelligent garbage can and an outside world is to connect with a mobile phone through Bluetooth, all data that needs to be transmitted to a remote server will transmits to the mobile phone via a mobile phone application through the Bluetooth, and then the mobile phone transmits data to the remote server through a telecommunication network, and the first version requires a user to turn on a Bluetooth function on the mobile phone.

12. The system of claim 9, wherein a version of communication between the intelligent garbage can and an outside world is to use Narrow band Internet of things (NB-IoT) module or internet of things (IOT) card module directly communicating with the remote server, and users do not need to turn on a Bluetooth function of the mobile phone.

13. The system of claim 9, wherein each storage tank is equipped with an infrared detector to detect remaining space in the intelligent garbage can.

14. The system of claim 9, wherein a power supply scheme of the intelligent garbage can supports two schemes including photovoltaics power supply or municipal power supply.

* * * * *